(12) United States Patent
Ishida (10) Patent No.: US 9,005,469 B2
(45) Date of Patent: Apr. 14, 2015

(54) COMPRESSOR AND REFRIGERATION CYCLE DEVICE USING SAME

(75) Inventor: Yoshinori Ishida, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 42 days.

(21) Appl. No.: 13/806,809

(22) PCT Filed: Mar. 11, 2011

(86) PCT No.: PCT/JP2011/001434
§ 371 (c)(1),
(2), (4) Date: Dec. 24, 2012

(87) PCT Pub. No.: WO2012/001842
PCT Pub. Date: Jan. 5, 2012

(65) Prior Publication Data
US 2013/0098101 A1   Apr. 25, 2013

(30) Foreign Application Priority Data

Jul. 2, 2010  (JP) ................. 2010-151772

(51) Int. Cl.
| | | |
|---|---|---|
| *C09K 5/04* | (2006.01) |
| *C10M 171/00* | (2006.01) |
| *F25B 31/02* | (2006.01) |
| *F25B 1/00* | (2006.01) |
| *C10M 133/38* | (2006.01) |
| *C10M 135/00* | (2006.01) |
| *C10M 135/20* | (2006.01) |
| *C10M 137/10* | (2006.01) |
| *C10M 159/22* | (2006.01) |
| *C10M 169/04* | (2006.01) |
| *C10M 105/18* | (2006.01) |
| *C10M 105/38* | (2006.01) |
| *C10M 107/24* | (2006.01) |
| *C10M 107/34* | (2006.01) |
| *C10M 129/10* | (2006.01) |
| *C10M 133/12* | (2006.01) |

(52) U.S. Cl.
CPC ............ *C09K 5/045* (2013.01); *C10M 171/008* (2013.01); *F25B 31/026* (2013.01); *F25B 1/00* (2013.01); *C09K 5/04* (2013.01); *C10M 133/38* (2013.01); *C10M 135/00* (2013.01); *C10M 135/20* (2013.01); *C10M 137/10* (2013.01); *C10M 159/22* (2013.01); *C10M 169/04* (2013.01); *C10M 105/18* (2013.01); *C10M 105/38* (2013.01); *C10M 107/24* (2013.01); *C10M 107/34* (2013.01); *C10M 129/10* (2013.01); *C10M 133/12* (2013.01); *C09K 2205/126* (2013.01); *C10M 2207/026* (2013.01); *C10M 2207/027* (2013.01); *C10M 2207/028* (2013.01); *C10M 2207/044* (2013.01); *C10M 2207/283* (2013.01); *C10M 2209/04* (2013.01); *C10M 2209/043* (2013.01); *C10M 2209/062* (2013.01); *C10M 2209/102* (2013.01); *C10M 2209/1033* (2013.01); *C10M 2215/064* (2013.01); *C10M 2215/065* (2013.01); *C10M 2215/223* (2013.01); *C10M 2219/00* (2013.01); *C10M 2219/082* (2013.01); *C10M 2219/083* (2013.01); *C10M 2223/045* (2013.01); *C10M 2227/08* (2013.01); *C10N 2210/06* (2013.01); *C10N 2220/302* (2013.01); *C10N 2240/30* (2013.01); *C09K 2205/22* (2013.01); *C09K 2205/24* (2013.01); *F25B 2400/121* (2013.01)

(58) Field of Classification Search
USPC .......................................... 252/68
See application file for complete search history.

(56) References Cited

U.S. PATENT DOCUMENTS

| | | | | |
|---|---|---|---|---|
| 4,755,316 A * | 7/1988 | Magid et al. | ............ | 252/68 |
| 5,185,092 A * | 2/1993 | Fukuda et al. | ............ | 508/440 |
| 5,833,876 A * | 11/1998 | Schnur et al. | ............ | 252/68 |
| 2001/0053866 A1* | 12/2001 | Denninger et al. | ......... | 568/679 |
| 2010/0282999 A1 | 11/2010 | Shimomura et al. | | |
| 2011/0114075 A1* | 5/2011 | Mills | ............ | 126/263.01 |

FOREIGN PATENT DOCUMENTS

| | | |
|---|---|---|
| JP | 8-240362 | 9/1996 |
| JP | 11-236890 | 8/1999 |
| JP | 2009-74021 | 4/2009 |
| JP | 2009-126979 | 6/2009 |
| JP | 2010-265428 | 11/2010 |
| JP | 2010-265429 | 11/2010 |
| WO | 2008/061079 | 5/2008 |
| WO | 2009/057475 | 5/2009 |
| WO | 2010/146841 | 12/2010 |
| WO | 2011/024663 | 3/2011 |

* cited by examiner

*Primary Examiner* — John Hardee
(74) *Attorney, Agent, or Firm* — Hamre, Schumann, Mueller & Larson, P.C.

(57) ABSTRACT

According to a compressor and a refrigeration cycle device using same of the present invention, a refrigerant and refrigeration oil 103 are sealed in an container 101, the refrigerant is a hydrofluoroolefin having double bond of carbon in its composition or a mixture of hydrofluoroolefin as a base component and hydrofluorocarbon having no double bond, and at least one of benzotriazole, dialkyl dithiophosphoric acid zinc, dialkyl selenium, metal phenate, and organic nitrogen compound is included in the refrigeration oil 103, and it is an object to suppress the decomposition and polymerization of refrigeration oil and a refrigerant, and to secure reliability of the compressor and the refrigeration cycle device.

12 Claims, 8 Drawing Sheets

COMPRESSOR AND REFRIGERATION CYCLE DEVICE USING SAME

TECHNICAL FIELD

The present invention relates to enhancement of reliability of a compressor incorporated in a room air conditioner, a refrigerator or an air conditioner using a refrigerant which is mainly composed of hydrofluoroolefin having double bond between carbons of low global warming potential as a working refrigerant, and the invention also relates to enhancement of reliability of a refrigeration cycle device using same.

BACKGROUND TECHNIQUE

In conventional compressors and refrigeration cycle devices using same, there is a tendency that HFC (hydrofluorocarbon)-based refrigerant (HFC-based refrigerant, hereinafter) having zero ozone depletion potential is used as a working refrigerant. However, since this HFC-based refrigerant has extremely high global warming potential (GWP, hereinafter), the HFC-based refrigerant is acknowledged as a problem in recent years in terms of protection of the global environment. Hence, a refrigerant which is mainly composed of hydrofluoroolefin having double bond between carbons of low GWP is now under review.

A compressor and a refrigeration cycle device using a conventional HFC-based refrigerant will be described with reference to FIGS. 6 to 8 (see patent documents 1 and 2 for example).

Figure 6:
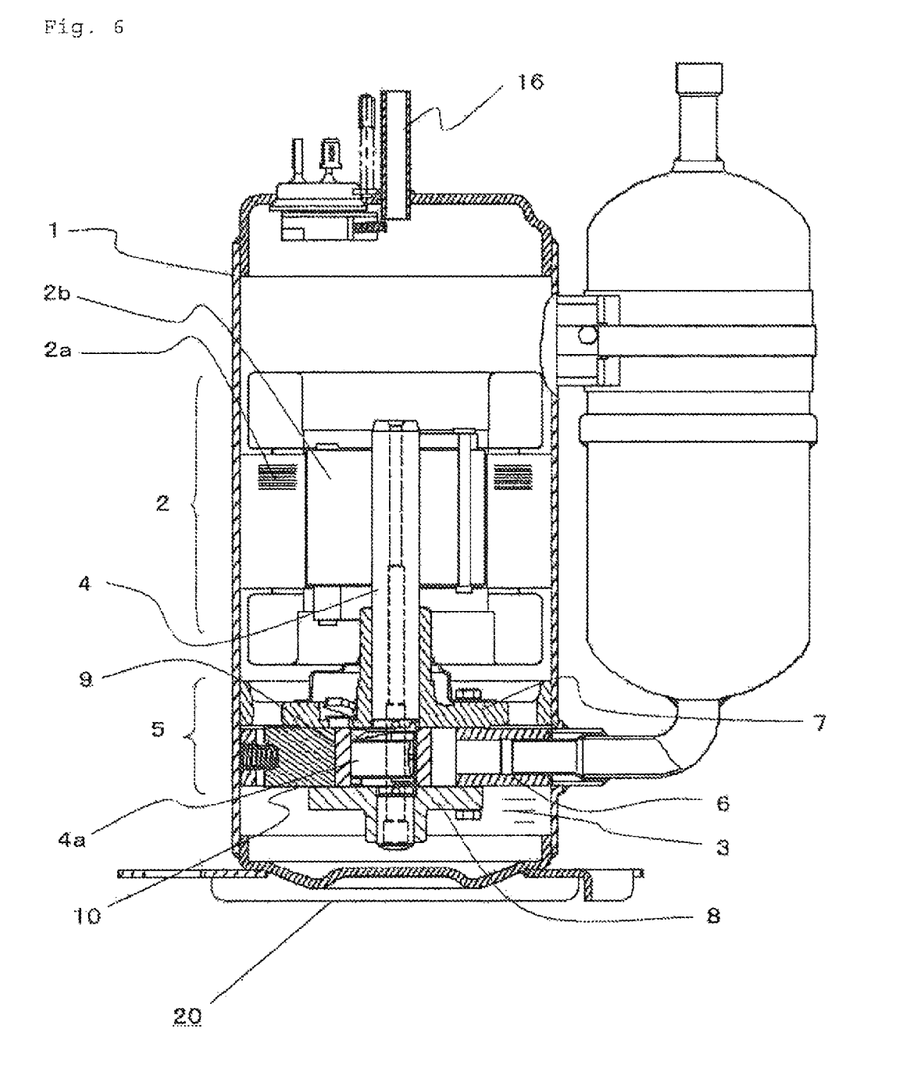
FIG. 6 is a vertical sectional view of a conventional rotary compressor.

FIG. 6 is a vertical sectional view of a rotary compressor using the conventional HFC-based refrigerant.

A stator 2a of a motor 2 is fixed to an upper portion in a container 1, a compressing mechanism 5 including a shaft 4 driven by a rotor 2b is fixed to a lower portion in the container 1. A main bearing 7 is fixed to an upper end of a cylinder 6 of a compressing mechanism 5 through a bolt, and an auxiliary bearing 8 is fixed to a lower end of the cylinder 6 through a bolt. In the cylinder 6, a piston 9 is inserted into an eccentric portion 4a of the shaft 4, and the piston 9 is eccentrically rotated.

In the container 1, R410A (mixture of HFC32 and HFC125) is charged as a refrigerant, and refrigeration oil 3 composed of polyol ester having compatibility with the refrigerant is accumulated in a bottom of the container 1.

Figure 7:
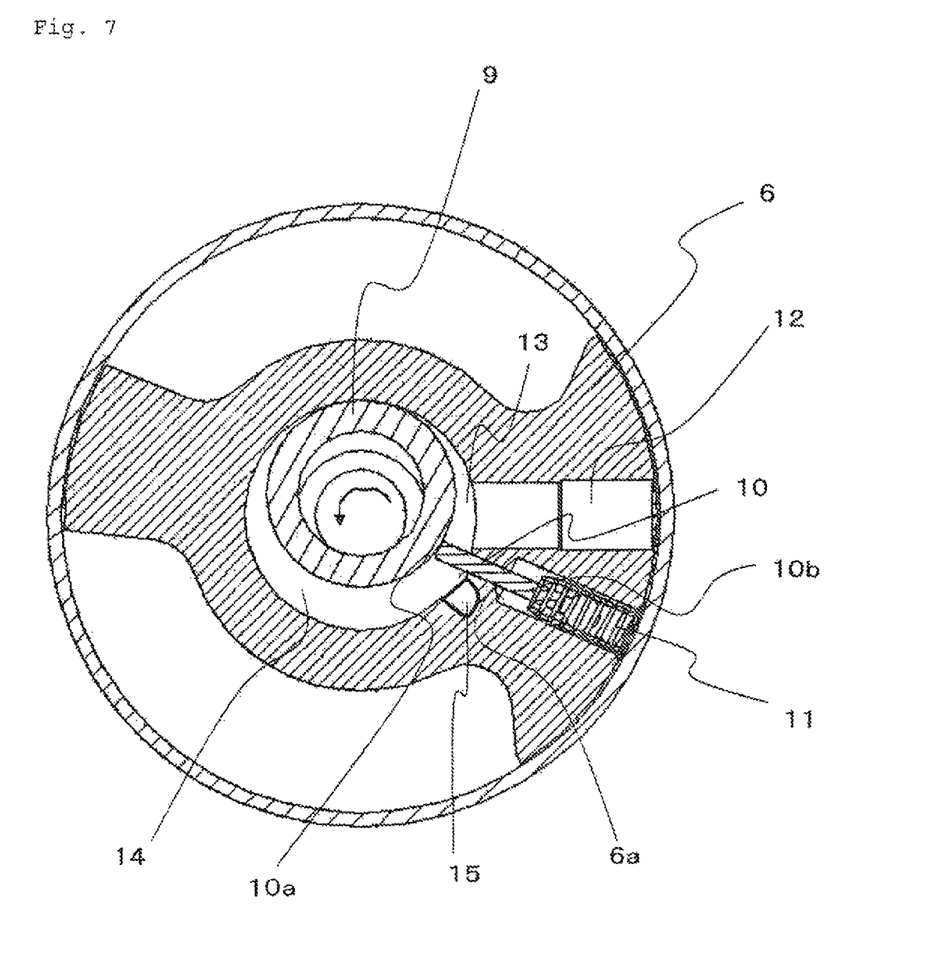
FIG. 7 is a transverse sectional view of the conventional rotary compressor.

FIG. 7 is a transverse sectional view of the rotary compressor using the conventional HFC-based refrigerant. The piston 9 is inserted into an inner surface of the cylinder 6, the piston 9 rotates together with rotation of the shaft 4, and a refrigerant is sucked and compressed in a suction chamber 13 and a compression chamber 14 which is partitioned by a vane 10.

Action and operation of the rotary compressor having the above-described configuration will be described below.

First, a refrigerant is sucked from a suction port 12 formed in the cylinder 6 into the suction chamber 13. A refrigerant in the compression chamber 14 is compressed as the piston 9 rotates in a left-handed direction (direction of arrow), and the refrigerant is discharged into the container 1 from a discharge port (not shown) through a discharge notch 15. The compressed refrigerant discharged into the container 1 passes through a gap of the motor 2, and the refrigerant is discharged from a discharge pipe 16 provided on an upper portion of the container 1. At that time, mist of the refrigeration oil is also discharged together.

Due to a configuration of the rotary compressing mechanism, a portion thereof which Due to a configuration is a contact portion between a tip end of the vane 10 and an outer periphery of the piston 9. High discharge pressure is applied to a back portion 10b of the vane 10 in addition to a vane spring 11, and a large force caused by differential pressure with respect to pressure in the cylinder acts. Therefore, a contact state between the tip end 10a of the vane 10 and the outer periphery of the piston 9 becomes boundary lubrication and this portion is under a high temperature severe environment condition. Hence, as disclosed in patent document 2, the vane 10 is subjected to nitriding treatment, and a surface of the vane 10 is plated with CrN (chromium nitride) ion or TiN (titanium nitride) ion, thereby enhancing wear resistance to secure reliability.

Next, a basic refrigeration cycle device in which a rotary compressor 20 which sucks, compresses and discharges the HFC-based refrigerant described in patent document 2 is disposed will be described with reference to FIG. 8.

Figure 8:
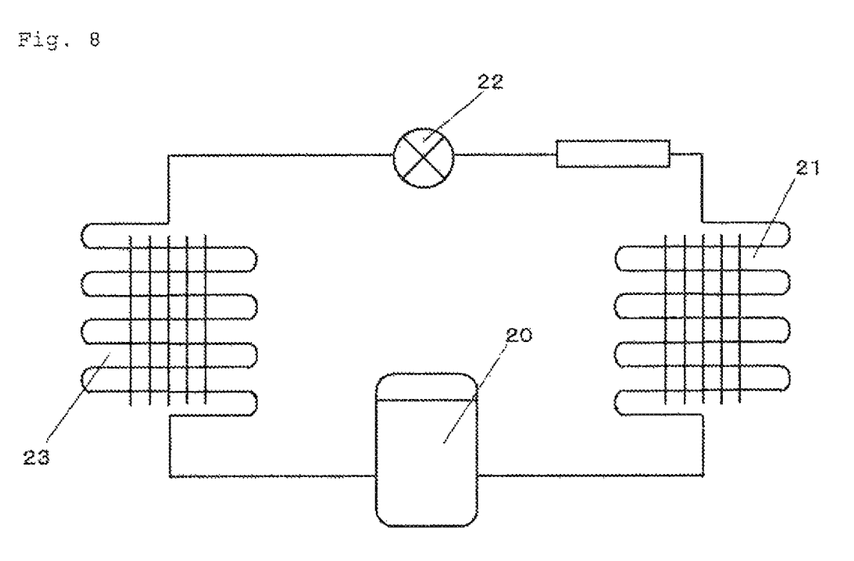
FIG. 8 is a diagram showing a configuration of a conventional refrigeration cycle device.

As shown in FIG. 8, the rotary compressor 20 compresses low temperature and low pressure refrigerant gas, discharges high temperature and high pressure refrigerant gas and sends the refrigerant gas to a condenser 21. The HFC-based refrigerant gas sent to the condenser 21 becomes high temperature and high pressure refrigerant liquid while discharging its heat into air, and is sent to an expansion mechanism 22 (e.g., expansion valve or capillary tube). The high temperature and high pressure refrigerant liquid which passes through the expansion mechanism 22 becomes low temperature and low pressure moisture vapor by a throttle effect, and is sent to an evaporator 23. The refrigerant which enters the evaporator 23 absorbs heat from its periphery, and low temperature and low pressure refrigerant gas which comes out from the evaporator 23 is sucked into the rotary compressor 20, and the same cycle is repeated thereafter.

PRIOR ART DOCUMENT

Patent Documents

[Patent Document 1] Japanese Patent Application Laid-open No. H11-236890
[Patent Document 2] Japanese Patent Application Laid-open No. H8-240362

SUMMARY OF THE INVENTION

Problem to be Solved by the Invention

However, a refrigerant which is mainly composed of hydrofluoroolefin having double bond of carbon has a problem in stability.

When a refrigerant which is mainly composed of hydrofluoroolefin is used in a refrigeration cycle device, since most of members constituting the cycle is made of metal (copper, iron or aluminum), the members themselves function as catalysts, and there is fear that a refrigerant having refrigeration oil or double bond of carbon is decomposed and polymerized. Among them, a sliding member, especially a member surface in the compressor 20 having the contact portion between the tip end of the vane 10 and the outer periphery of the piston 9 is activated due to friction, and it is considered that this portion is prone to function as a catalyst. Therefore, decomposition and polymerization of the refrigeration oil and the refrigerant are accelerated, sludge is formed, and there is a possibility that the compressor breaks down or refrigerating ability is deteriorated due to loss in a flow rate of a refrigerant in the refrigeration cycle, e.g., in the expansion mechanism 22 (e.g., capillary tube which is a thin tube).

The present invention has been accomplished in view of the problem of the conventional technique, and it is an object of the invention to suppress the decomposition and polymerization of refrigeration oil and a refrigerant, and to secure reliability of a compressor and a refrigeration cycle device using same.

Means for Solving the Problem

To achieve the above object, the present invention provides a compressor wherein a refrigerant and refrigeration oil are sealed, the refrigerant is a hydrofluoroolefin having double bond of carbon in its composition or a mixture of hydrofluoroolefin as a base component and hydrofluorocarbon having no double bond, and at least one of benzotriazole, dialkyl dithiophosphoric acid zinc, dialkyl selenium, metal phenate, and organic nitrogen compound is included in the refrigeration oil. An adsorption film is formed on a surface of a metal member constituting the refrigeration cycle especially on a surface of a compressor sliding member, a direct contact between a metal member and refrigeration oil molecule or refrigerant molecule composed of hydrofluoroolefin is suppressed, it is allowed to react with wearing powder which floats in the refrigeration oil or dissolved metal to form inert metal compound to suppress the catalyst function, thereby lowering the deterioration speed of refrigerant and refrigeration oil.

Effect of the Invention

According to the invention, an adsorption film is formed on a surface of a metal member constituting the refrigeration cycle especially on a surface of a compressor sliding member of the compressor, a direct contact between a metal member and refrigeration oil molecule or refrigerant molecule composed of hydrofluoroolefin is suppressed, it is allowed to react with wearing powder which floats in the refrigeration oil or dissolved metal to form inert metal compound to suppress the catalyst function, thereby lowering the deterioration speed of refrigerant and refrigeration oil, and long term reliability of the compressor and the refrigeration cycle device using same can be secured.

MODE FOR CARRYING OUT THE INVENTION

A first aspect of the invention provides a compressor wherein a refrigerant and refrigeration oil are sealed, the refrigerant is a hydrofluoroolefin having double bond of carbon in its composition or a mixture of hydrofluoroolefin as a base component and hydrofluorocarbon having no double bond, and at least one of benzotriazole, dialkyl dithiophosphoric acid zinc, dialkyl selenium, metal phenate, and organic nitrogen compound is included in the refrigeration oil. According to this aspect, According to the invention, an adsorption film is formed on a surface of a metal member constituting the refrigeration cycle especially on a surface of a compressor sliding member of the compressor, a direct contact between a metal member and refrigeration oil molecule or refrigerant molecule composed of hydrofluoroolefin is suppressed, it is allowed to react with wearing powder which floats in the refrigeration oil or dissolved metal to form inert metal compound to suppress the catalyst function, thereby lowering the deterioration speed of refrigerant and refrigeration oil, and long term reliability of the compressor and the refrigeration cycle device using same can be secured.

According to a second aspect of the invention, in the first aspect, an amine-based antioxidant is included in the refrigeration oil. According to this aspect, catalyst function caused by a metal member is suppressed, an active linkage transmitting agent which is decomposed material of refrigeration oil or a refrigerant is captured, oxidation linkage reaction of the refrigerant or the refrigeration oil is suppressed, and it is possible to secure long term reliability of the compressor and the refrigeration cycle device using same in a synergetic manner.

According to a third aspect of the invention, in the second aspect, the amine-based antioxidant is at least one of phenyl-alpha-naphthylamine and dialkyl diphenyl amine. According to this aspect, since versatile material is used, this is reasonable, it is possible to deterioration of the refrigerant and the refrigeration oil is suppressed, and it is possible to secure long term reliability of the compressor and the refrigeration cycle device using same.

According to a fourth aspect of the invention, in the first aspect, a phenol-based antioxidant is included in the refrigeration oil. According to this aspect, catalyst function caused by a metal member is suppressed, an active linkage transmitting agent which is decomposed material of refrigeration oil or a refrigerant is captured, oxidation linkage reaction of the refrigerant or the refrigeration oil is suppressed, and it is possible to secure long term reliability of the compressor and the refrigeration cycle device using same in a synergetic manner.

According to a fifth aspect of the invention, in the fourth aspect, the phenol-based antioxidant is at least one of 2,6-ditertiary-butyl-p-cresol (DBPC), 3-arylbenzofuran-2-one (intramolecule cyclic ester of hydroxycarboxylic acid). According to this aspect, since versatile material is used, this is reasonable, it is possible to deterioration of the refrigerant and the refrigeration oil is suppressed, and it is possible to secure long term reliability of the compressor and the refrigeration cycle device using same.

According to a sixth aspect of the invention, in the first aspect, a sulfur, phosphorus-based antioxidant is included in the refrigeration oil. According to this aspect, catalyst function caused by a metal member is suppressed, hydroperoxide produced during oxidation deterioration reaction is decomposed and it is changed to a stable compound, the linkage reaction of oxidation deterioration is suppressed, and it is possible to secure long term reliability of the compressor and the refrigeration cycle device using same in a synergetic manner.

According to a seventh aspect of the invention, in the sixth aspect, the sulfur, phosphorus-based antioxidant is at least one of dibenzyl disulfide, dicetyl sulfide, dialkyl dithiophosphoric acid zinc and diallyl dithiophosphoric acid zinc (ZnDTP). According to this aspect, since versatile material is used, this is reasonable, it is possible to deterioration of the refrigerant and the refrigeration oil is suppressed, and it is possible to secure long term reliability of the compressor and the refrigeration cycle device using same.

According to an eighth aspect of the invention, in any one of the first to seventh aspects, the hydrofluoroolefin is tetrafluoropropene (HFO1234yf), the hydrofluorocarbon is one or both of difluoromethane (HFC32) and pentafluoroethane (HFC125), and the refrigeration oil is one of polyvinyl ether, polyol ester and polyalkylene glycol. According to this aspect, it is possible to secure a refrigerant having low GWP, small specific volume and high refrigerating ability, and since refrigeration oil having compatibility with the refrigerant can be used and thus, it is possible to secure long term reliability of the compressor and the refrigeration cycle device using same.

A ninth aspect of the invention provides a refrigeration cycle device for forming a refrigeration cycle which compresses, condenses, expands and evaporates a refrigerant, wherein the compressor according to any one of the first to eighth aspects. According to this aspect, an adsorption film is formed on a surface of a metal member constituting the refrigeration cycle especially on a surface of a compressor sliding member, a direct contact between a metal member and refrigeration oil molecule or refrigerant molecule composed of hydrofluoroolefin is suppressed, it is allowed to react with wearing powder which floats in the refrigeration oil or dissolved metal to form inert metal compound to suppress the catalyst function, thereby lowering the deterioration speed of refrigerant and refrigeration oil, and it is possible to secure long term reliability of the refrigeration cycle device.

Embodiments of the present invention will be described with reference to the drawings. The invention is not limited to the embodiments.

First Embodiment

Figure 1:
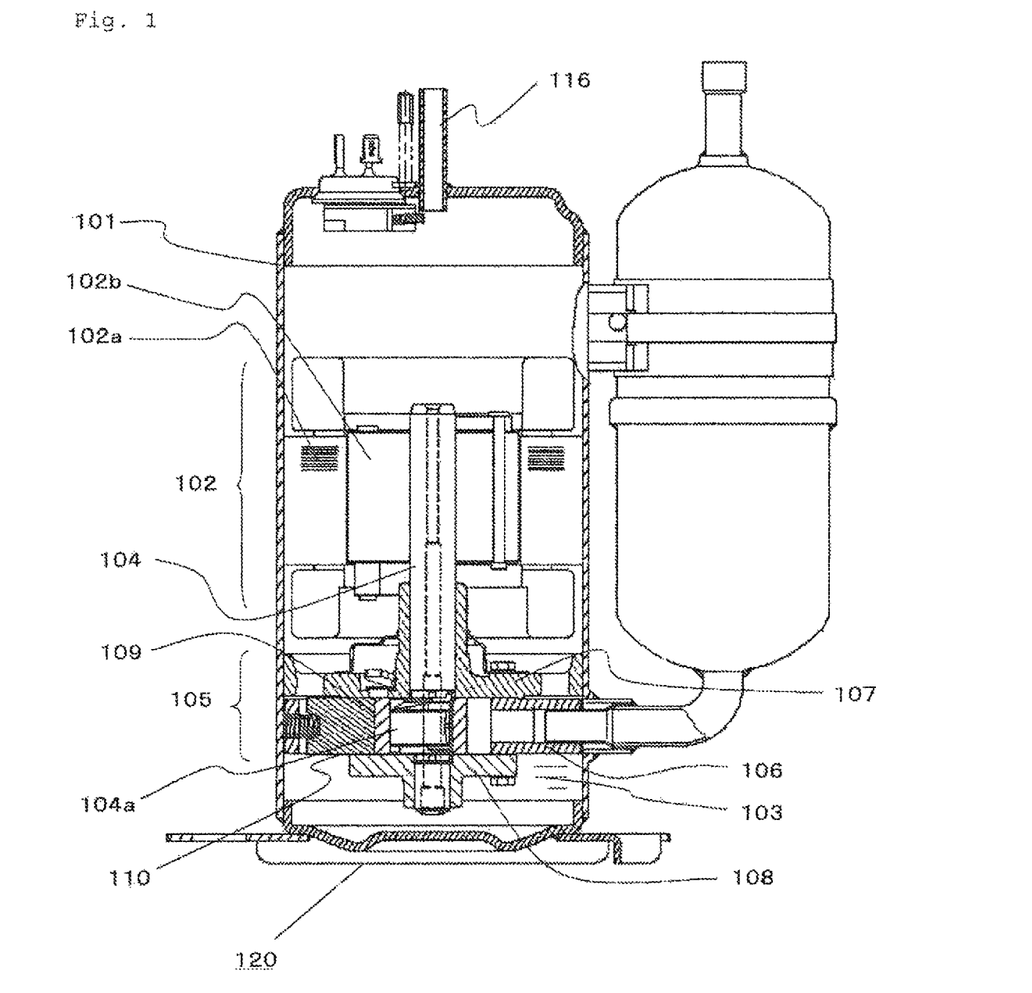
FIG. 1 is a vertical sectional view of a rotary compressor in a first embodiment of the present invention.

FIG. 1 is a vertical sectional view of a rotary compressor in a first embodiment of the present invention.

A stator 102a of a motor 102 is fixed to an upper portion in a container 101, a compressing mechanism 105 including a shaft 104 driven by a rotor 102b is fixed to a lower portion in the container 101. A main bearing 107 is fixed to an upper end of a cylinder 106 of the compressing mechanism 105 through a bolt, and an auxiliary bearing 108 is fixed to a lower end of the cylinder 106 through a bolt. In the cylinder 106, a piston 109 is inserted into an eccentric portion 104a of the shaft 104, and the piston 109 is eccentrically rotated. These members are made of metal material such as iron, copper and aluminum.

Hydrofluoroolefin (tetrafluoropropene: HFO1234yf) having double bond between carbons is charged into the container 101. Refrigeration oil 103 composed of polyol ester having compatibility with the HFO1234yf refrigerant is accumulated in a bottom of the container 101. A proper amount of benzotriazole is dispersed in refrigeration oil 103.

Figure 2:
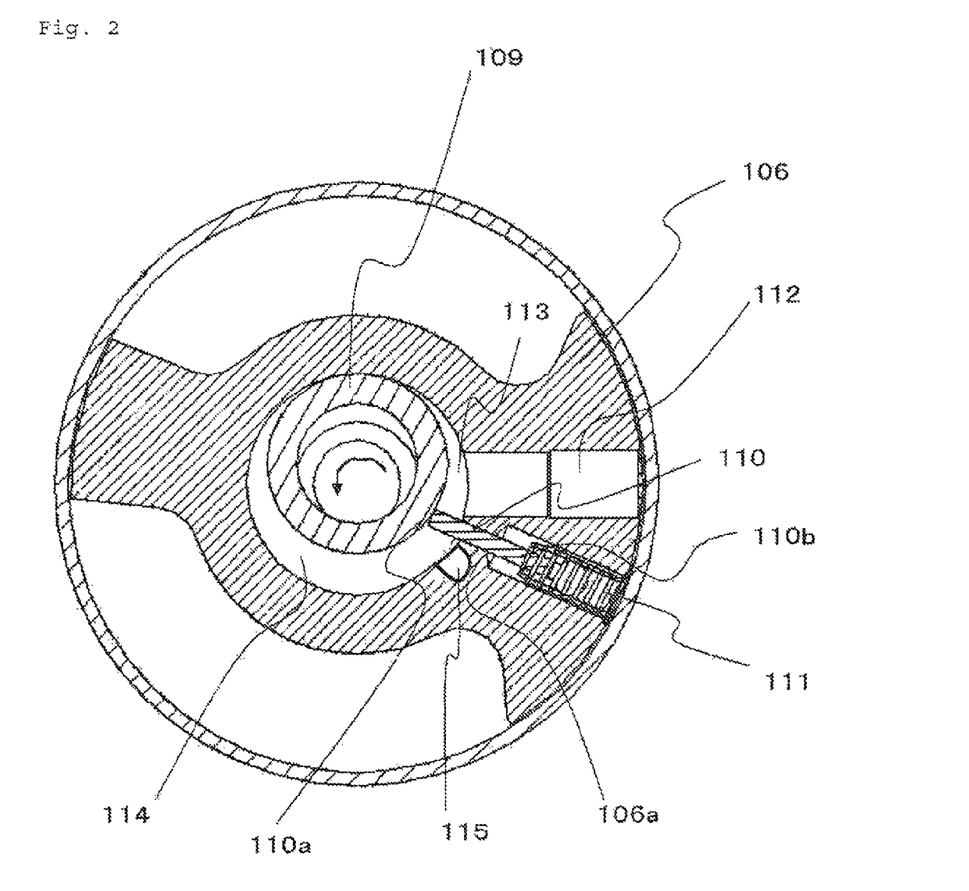
FIG. 2 is a transverse sectional view of the rotary compressor in the first embodiment of the invention.

FIG. 2 is a transverse sectional view of the rotary compressor in the first embodiment of the invention. The piston 109 is inserted into an inner surface of the cylinder 106, the piston 109 rotates together with rotation of the shaft 104, and a refrigerant is sucked and compressed by a suction chamber 113 and a compression chamber 114 partitioned by a vane 110.

Action and operation of the rotary compressor having the above-described configuration will be described below.

First, a HFC-based refrigerant is sucked from a suction port 112 formed in the cylinder 106 into the suction chamber 113. A refrigerant in the compression chamber 114 is compressed as the piston 109 rotates in a left-handed direction (direction of arrow), and the refrigerant is discharged into the container 101 from a discharge port (not shown) through a discharge notch 115. The refrigerant gas discharged into the container 101 passes through a gap of the motor 102, and the refrigerant is discharged from a discharge pipe 116 provided on an upper portion of the container 101. At that time, mist of the refrigeration oil is also discharged together.

Due to a configuration of the rotary compressing mechanism, a portion thereof which slides most severely is a contact portion between a tip end of the vane 110 and an outer periphery of the piston 109. High discharge pressure is applied to a back portion 110b of the vane 110 in addition to a vane spring 111, and a large force caused by differential pressure with respect to pressure in the cylinder 106 acts. Therefore, a contact state between the tip end 110a of the vane 110 and the outer periphery of the piston 109 becomes boundary lubrication and this portion is under a high temperature severe environment condition. The boundary lubrication is a state where an oil film having sufficient thickness like fluid lubrication is not held, friction is carried out across an adsorbed molecule film (boundary film) formed between two surfaces of the friction portion.

Figure 3:
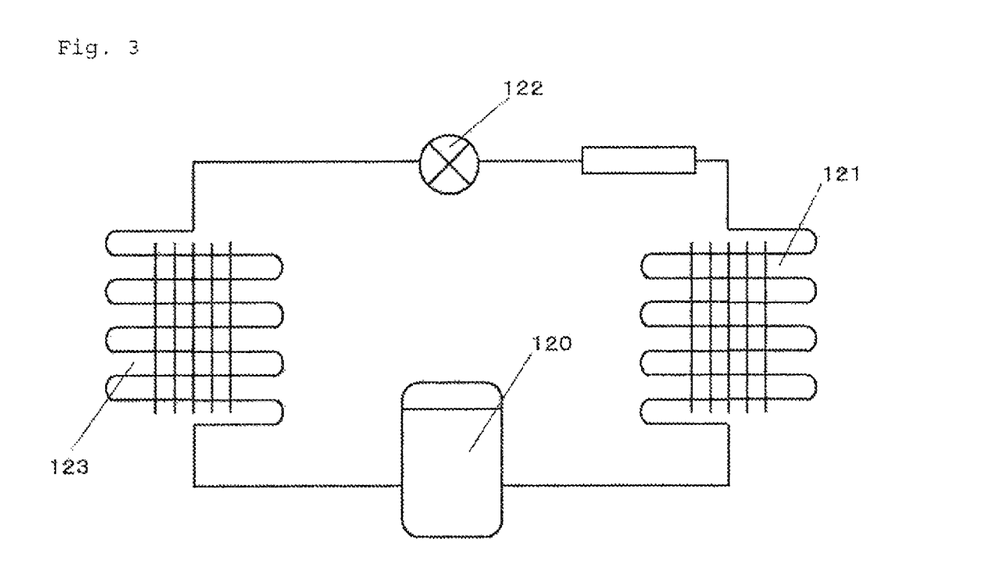
FIG. 3 is a diagram showing a configuration of a refrigeration cycle device in the first embodiment of the invention.

Next, a basic refrigeration cycle device in which a compressor 120 which sucks, compresses and discharges a refrigerant is disposed will be described with reference to FIG. 3. As shown in FIG. 3, the refrigeration cycle device includes the compressor 120, a condenser 121, an expansion mechanism 122 and an evaporator 123.

The rotary compressor 120 compresses low temperature and low pressure refrigerant gas, discharges high temperature and high pressure refrigerant gas and sends the refrigerant gas to the condenser 121. The refrigerant gas sent to the condenser 121 becomes high temperature and high pressure refrigerant liquid while discharging its heat into air, and is sent to the expansion mechanism 122 (e.g., expansion valve or capillary tube). The high temperature and high pressure refrigerant liquid which passes through the expansion mechanism 122 becomes low temperature and low pressure moisture vapor by a throttle effect, and is sent to the evaporator 123. The refrigerant which enters the evaporator 123 absorbs heat from its periphery, and low temperature and low pressure refrigerant gas which comes out from the evaporator 123 is sucked into the rotary compressor 120, and the same cycle is repeated thereafter.

Most of members used for the refrigeration cycle device including the compressor 120 is made of metal material such as iron, copper and aluminum.

Here, before an actual machine test using the refrigeration cycle 120 was carried out, to accelerate and evaluate change with the passage of time of deterioration of refrigeration oil, an autoclave test was carried out. A principle of the autoclave is that subject gas or liquid is put into a pressure-resistant container (pressure-resistant device), pressure (temperature also according to circumstances) is increased so that specific chemical reaction in an object in the container is allowed to proceed quickly.

First, 30 g of refrigeration oil, one copper, one iron and one aluminum each of which became a catalyst and each of which had a diameter of 1.5 mm and a length of 50 mm were placed in the pressure-resistant glass pipe and then, they were stored in a stainless cylinder and the cylinder was evacuated into vacuum. Then, 30 g of a refrigerant was charged thereinto. To facilitate deterioration of the refrigeration oil and the refrigerant, 1000 ppm of moisture and 100 cc of air were also put into the cylinder. The refrigeration oil used in any of combinations is polyol ester oil which is actually used for the conventional HFC-based refrigerant.

Combinations (Table 1) of the refrigerant and the refrigeration oil used in the test are as follows.

TABLE 1

|  | Refrigerant | Refrigeration oil | |
| --- | --- | --- | --- |
|  |  | | Addition agent (benzotriazole) |
| Example 1 | HFO1234yf | Polyol ester oil | Included |
| Comparative example 1 condition 1 | HFO1234yf | Polyol ester oil | Not included |
| Comparative example 1 condition 2 | R410A | Polyol ester oil | Not included |

The example 1 is a combination of polyol ester oil in which a refrigerant is tetrafluoropropene (HFO1234yf) and refrigeration oil is benzotriazole, and proper amounts of them are dispersed.

As comparison, the following two kinds of combinations were used.

The comparative example 1 condition 1 is a combination in which a refrigerant is HFO1234yf and refrigeration oil is polyol ester oil. The comparative example 1 condition 2 is a combination in which a refrigerant is R410A (mixture of HFC32 and HFC125) which is a conventional HFC-based refrigerant and refrigeration oil is polyol ester oil.

As a test condition, a test temperature was set to 175° C., maximum time was set to 500 hours, five cylinders were prepared for every one combination, the cylinders were opened one by one every 100 hours, and change with the passage of time of a total acid value of refrigeration oil was evaluated. Here, the total acid value is a number of milligrams (mg) of potassium hydrate required for neutrizing a total acid component included in 1 g of a sample. The acid value is an index utilized for knowing a degree of oxidation during usage of lubricant or utilized for evaluation after an oxidation test of lubricant or a practical test.

Figure 4:
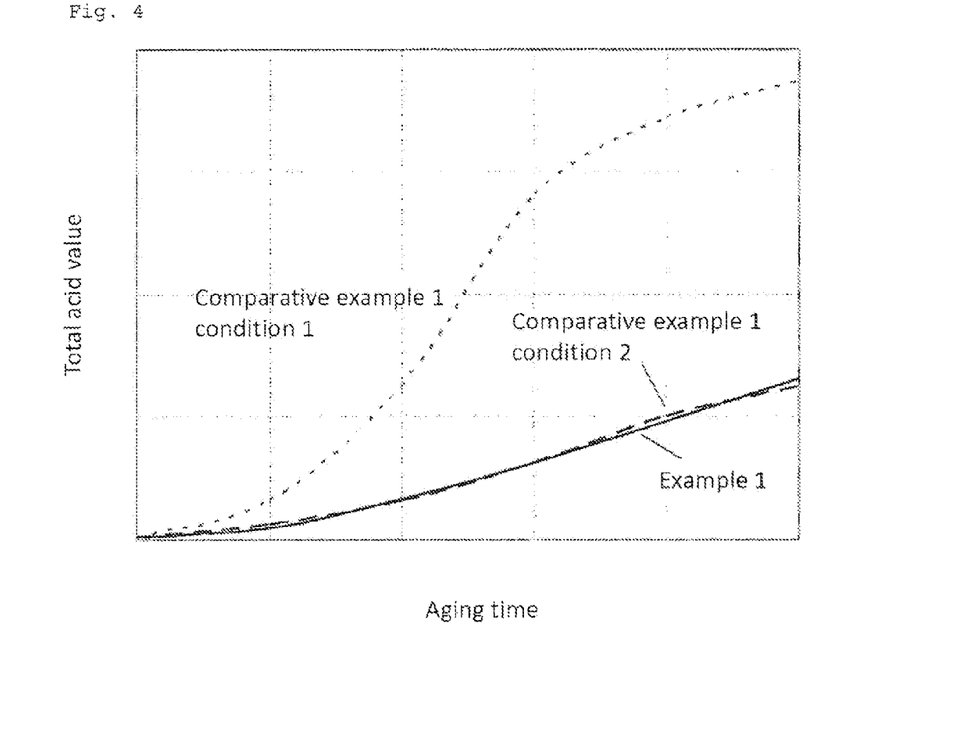
FIG. 4 is a characteristic correlation diagram between aging time and a total acid value in the first embodiment of the invention.

FIG. 4 is a characteristic correlation diagram between aging time and a total acid value in the first embodiment of the invention.

With reference to FIG. 4, in the case of the comparative example 1 condition 1, the total acid value was abruptly increased when 100 hours were elapsed after the test was started and eventually, the total acid value becomes about 150 times higher as compared with a total acid value of new oil. In the case of the comparative example 1 condition 2, the total acid value was slightly increased in a quadratic function manner after the test was started and eventually, the total acid value became about 50 times higher than that of new oil.

Consideration of change with the passage of time of the total acid value will be described below.

It is considered that if refrigeration oil is exposed to a high temperature or the refrigeration oil is stirred together with mixed air and moisture and, the refrigeration oil is gradually deteriorated. Constituent molecule of refrigeration oil is decomposed by mixed air and moisture under high temperature environment, and active free radical is created. The free radical and air react with each other and peroxide radical (OH radical, hereinafter) is created. It is considered that the free radical and the OH radical oxidize constituent molecule of new refrigeration oil and become hydroperoxide, form new free radical, linkage is propagated, and they are oxidized one after another. Further, it is considered that a surface of charged metal (copper, iron, aluminum) is activated under high temperature environment, and this functions as catalyst which accelerates deterioration of refrigeration oil and reaction of oxidation linkage.

Next, it is considered that there is a large difference in an increasing rate between the comparative example 1 condition 1 and the comparative example 1 condition 2 due to easiness of decomposition of the charged refrigerant. That is, it is considered that R410A which is the HFC-based refrigerant is not easily decomposed by air or moisture and is extremely stable material, but HFO1234yf has double bond of carbon due to its structure, the HFO1234yf is prone to be decomposed by air under high temperature environment. That is, it is considered that increase in the total acid value of the comparative example 1 condition 2 is caused by deterioration and oxidation of refrigeration oil.

It is considered that the HFO1234yf is decomposed by air or metal catalyst and hydrogen fluoride (hydrofluoric acid) is created, and this further facilitates decomposition of refrigeration oil and as a result, this creates the difference in the increasing rate of the total acid value between the comparative example 1 condition 1 and the comparative example 1 condition 2.

If the deterioration, oxidation and decomposition of refrigeration oil and refrigerant proceed, there is a possibility that they are polymerized and muddy sludge is produced. In the compressor and a cycle apparatus using same, the compressor breaks down by the sludge, the capillary tube which is a thin tube in the refrigeration cycle device is clogged, and there is a possibility that refrigerating ability is deteriorated.

On the other hand, in the case of the example 1 which is the first embodiment, a proper amount of benzotriazole is dispersed in polyol ester oil which is the refrigeration oil, the increase in the total acid value is remarkably suppressed, the increase of the total acid value is suppressed to about 50 times of that before the test even at a final stage, and it can be found that the total acid value is suppressed to about the same level as that of the conventional HFC-based refrigerant.

It is considered that this is because benzotriazole adsorbs on a surface of metal (copper, iron, aluminum) charged as catalyst to form a thin film so that polyol ester oil, HFO1234yf molecule and metal do not come into direct contact with each other, a facilitating effect of deterioration, oxidation and decomposition of polyol ester oil and HFO1234yf caused by metal catalyst dissolved in oil is suppressed, generation of free radical and OH radical which are fundamental factor for increasing the total acid value could be suppressed.

Next, the refrigerant and refrigeration oil which were the combinations of the example 1 and air and moisture were charged into the container 101 of the refrigeration cycle 120, a refrigeration cycle device was set, and operation was carried out for 1000 hours under an overload condition.

As a result of measurement of the total acid value of the refrigeration oil after the test, it was confirmed that the increase in the total acid value was about the same as that of the conventional HFC-based refrigerant. According to this, even if air and moisture are slightly mixed into the refrigeration cycle, speed of deterioration and oxidation of the refrigeration oil and refrigerant can be made slow. Even if HFO1234yf is used as a refrigerant, it is possible to use polyol ester oil corresponding to the conventional HFC refrigerant only by adding benzotriazole.

It is considered that this is because benzotriazole dispersed in refrigeration oil adsorbs on the various metal members constituting the refrigeration cycle device which is considered to function as catalyst, especially on a sliding portion in the compressor 120 which is prone to be activated by friction, a thin film is formed so that the refrigeration oil, the refrigerant molecule and the metal portion do not come into direct contact with each other, it reacts with friction powder in the refrigeration oil and dissolved metal, it becomes inert metal compound, and the catalyst function is remarkably suppressed.

From the above result, the refrigerant and the refrigeration oil are sealed, as the refrigerant, hydrofluoroolefin having double bond of carbon, the base component composed of hydrofluoroolefin or a mixture of hydrofluorocarbon having no double bond is included in composition, benzotriazole is included in the refrigeration oil, an adsorption film is formed on a surface of a metal member constituting the refrigeration cycle especially on a surface of a compressor sliding member, a direct contact between a metal member and refrigeration oil molecule or refrigerant molecule composed of hydrofluoroolefin is suppressed, it is allowed to react with wearing powder which floats in the refrigeration oil or dissolved metal to form inert metal compound to suppress the catalyst function, thereby lowering the deterioration speed of refrigerant and refrigeration oil, and long term reliability of the compressor and the refrigeration cycle device using same can be secured.

Although benzotriazole is used in the embodiment, the same effect can be obtained even if at least one of the following elements is used: dialkyl dithiophosphoric acid zinc, dialkyl selenium, metal phenate and organic nitrogen compound.

If hydrofluorocarbon (HFC32, HFC125) having no double bond is mixed in the tetrafluoropropene (HFO1234yf) used in the embodiment, although it is zeotropic mixture refrigerant, the temperature difference can be reduced, and behavior thereof becomes close that of a pseudo-azeotropic mixture refrigerant. Therefore, cooling performance and coefficient of performance (COP) of the cooling cycle apparatus can also be improved. Although the HFO1234yf refrigerant alone is used in the embodiment, the same effect can be obtained even if a mixture refrigerant is used.

Here, it is necessary to mix two components or three components so that GWP of the mixture refrigerant becomes 5 or more and 750 or less, preferably 350 or less. To mix HFO1234yf and HFC32 with each other to make GWP 350 or less, it is preferable that HFO1234yf is made 49 wt % or more. To mix HFO1234yf and HFC125 with each other to make GWP 750 or less, it is preferable that HFO1234yf is 78.7 wt % or more, and to make GWP 350 or less, it is preferable that HFO1234yf is made 91.1 wt % or more.

According to this configuration, even if non-collected refrigerant is discharged into atmosphere, influence on global warming can be made extremely small.

Although polyol ester oil having compatibility with HFO1234yf is used as the refrigeration oil in the embodiment, even if refrigeration oil composed of polyvinyl ether or polyalkylene glycol having compatibility is used, refrigeration oil which goes into the refrigeration cycle can be collected into the rotary compressor, and it is likewise possible to obtain a reliable rotary compressor. Even if a mixture refrigerant including the HFC refrigerant is used, since the refrigeration oil has the compatibility, the same effect can be obtained.

The embodiment has been described based on the rotary compressor, but even if the invention is applied to compressor of different compressing type, e.g., other rotary compressors of sliding vane type, scroll compressors and reciprocating compressors, the same effect can be obtained.

Second Embodiment

A second embodiment will be described below based on FIG. 5. The same symbols are allocated to the same configurations as those of the first embodiment, and detailed description thereof will be omitted.

Here, before an actual machine test using the refrigeration cycle 120 was carried out, to accelerate and evaluate change with the passage of time of deterioration of refrigeration oil, an autoclave test was carried out.

First, 30 g of refrigeration oil, one copper, one iron and one aluminum each of which became a catalyst and each of which had a diameter of 1.5 mm and a length of 50 mm were placed in the pressure-resistant glass pipe and then, they were stored in a stainless cylinder and the cylinder was evacuated into vacuum. Then, 30 g of a refrigerant was charged thereinto. To facilitate deterioration of the refrigeration oil and the refrigerant, 1000 ppm of moisture and 100 cc of air were also put into the cylinder. The refrigeration oil used in any of combinations is polyol ester oil which is actually used for the conventional HFC-based refrigerant.

Combinations (Table 2) of the refrigerant and the refrigeration oil used in the test are as follows.

TABLE 2

| | | | Refrigeration oil | | | |
|---|---|---|---|---|---|---|
| | Refrigerant | Base oil | Addition agent, (benzotriazole) | Antioxidant (amine-based) | Antioxidant (phenol-based) | Antioxidant (sulfur, phosphorus-based) |
| Example 2 condition 1 | HFO1234yf | Polyol ester oil | Included | Included | Not included | Not included |
| Example 2 condition 2 | HFO1234yf | Polyol ester oil | Included | Not included | Included | Not included |
| Example 2 condition 3 | HFO1234yf | Polyol ester oil | Included | Not included | Not included | Included |
| Comparative example 1 condition 1 | HFO1234yf | Polyol ester oil | Not included | Not included | Not included | Not included |
| Comparative example 1 condition 2 | R410A | Polyol ester oil | Not included | Not included | Not included | Not included |

In the example 2 condition 1 in the embodiment, a refrigerant is tetrafluoropropene (HFO1234yf) which is hydrofluoroolefin, and refrigeration oil is a combination of polyol ester oil in which a proper amount of benzotriazole and a proper amount of phenyl-alpha-naphthylamine which is amine-based antioxidant are dispersed. In the example 2 condition 2, a refrigerant is HFO1234yf, and refrigeration oil is a combination of polyol ester oil in which a proper amount of benzotriazole and a proper amount of 2,6-ditertiary-butyl-p-cresol (DBPC) which is phenol-based antioxidant are dispersed. In the example 2 condition 3, a refrigerant is HFO1234yf, and refrigeration oil is a combination of polyol ester oil in which a proper amount of benzotriazole and a proper amount of diallyl dithiophosphoric acid zinc (ZnDTP) which is sulfur, phosphorus-based antioxidant are dispersed.

As the comparative examples, the following two kinds were used.

In the comparative example 1 condition 1, a refrigerant is tetrafluoropropene (HFO1234yf) which is hydrofluoroolefin, and refrigeration oil is a combination of polyol ester oil. In the comparative example 1 configuration 2, a refrigerant is R410A which is the conventional HFC-based refrigerant, and refrigeration oil is a combination of polyol ester oil.

As a test condition, a test temperature was set to 175° C., maximum time was set to 500 hours, five cylinders were prepared for every one combination, the cylinders were opened one by one every 100 hours, and change with the passage of time of a total acid value of refrigeration oil was evaluated.

Figure 5:
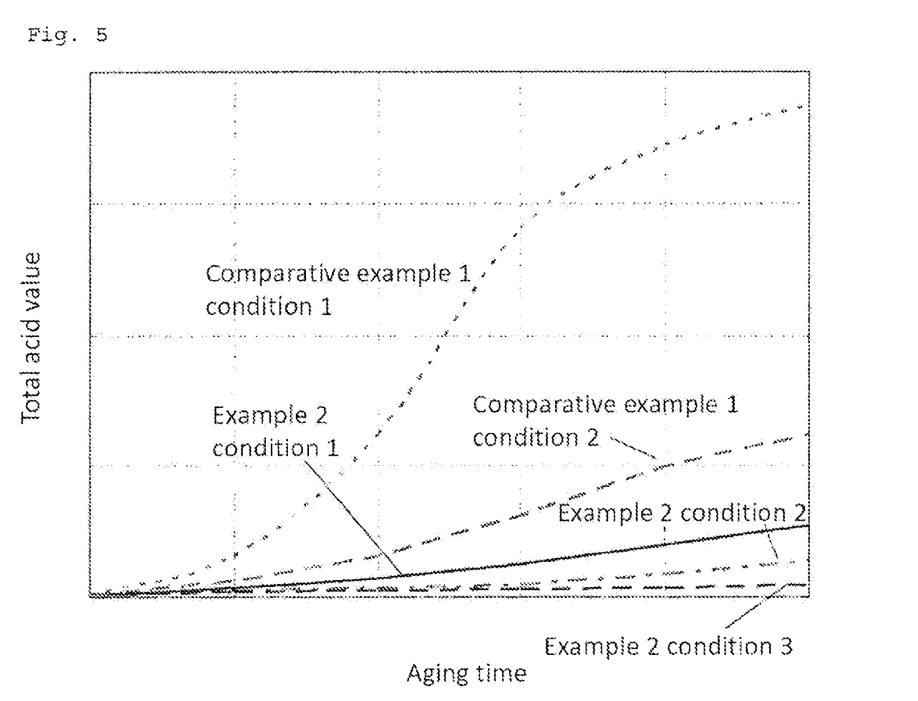
FIG. 5 is a characteristic correlation diagram between aging time and a total acid value in a second embodiment of the invention.

FIG. 5 is a characteristic correlation diagram between aging time and a total acid value in the second embodiment of the invention.

With reference to FIG. 5, in the case of the comparative example 1 condition 1, the total acid value was abruptly increased when 100 hours were elapsed after the test was started and eventually, the total acid value becomes about 150 times higher as compared with a total acid value of new oil. In the case of the comparative example 1 condition 2, the total acid value was increased in a quadratic function manner after the test was started but eventually, the total acid value became about 50 times higher than that of new oil.

Consideration of change with the passage of time of the total acid value will be described below.

First, it is considered that if refrigeration oil is exposed to a high temperature or the refrigeration oil is stirred together with mixed air and moisture and, the refrigeration oil is gradually deteriorated. Constituent molecule of refrigeration oil is decomposed by mixed air and moisture, and active free radical is created. The free radical and air react with each other and peroxide radical (OH radical, hereinafter) is created. It is considered that the free radical and the OH radical oxidize constituent molecule of new refrigeration oil and become hydroperoxide, form new free radical, linkage is propagated, and they are oxidized one after another. Further, it is considered that a surface of charged metal (copper, iron, aluminum) is activated at high temperature, and this functions as catalyst which accelerates deterioration of refrigeration oil and reaction of oxidation linkage.

Next, concerning the fact that there is a large difference in an increasing rate between the comparative example 1 condition 1 and the comparative example 1 condition 2, it is considered as follows. This fact is caused by influence of the charged refrigerant. That is, it is considered that R410A which is the HFC-based refrigerant is not easily decomposed by air or moisture and is extremely stable material, but HFO1234yf has double bond of carbon due to its structure, the HFO1234yf is prone to be decomposed by air. That is, it is considered that increase in the total acid value of the comparative example 1 condition 2 is caused by deterioration and oxidation of refrigeration oil.

It is considered that the HFO1234yf is decomposed by air or metal catalyst and hydrogen fluoride (hydrofluoric acid) is created, and this further facilitates decomposition of refrigeration oil and as a result, this creates the difference in the increasing rate of the total acid value between the comparative example 1 condition 1 and the comparative example 1 condition 2.

If the deterioration, oxidation and decomposition of refrigeration oil and refrigerant proceed, there is a possibility that they are polymerized and muddy sludge is produced. In the compressor and a cycle apparatus using same, the compressor breaks down by the sludge, the capillary tube which is a thin tube in the refrigeration cycle device is clogged, and there is a possibility that refrigerating ability is deteriorated.

On the other hand, in the case of the example 2 condition 1 which is the second embodiment, a proper amount of benzotriazole and a proper amount of phenyl-alpha-naphthylamine are dispersed in polyol ester oil which is the refrigeration oil, thereby remarkably suppressing the increase in the total acid value, and even when 500 hours are elapsed after the test, it can be found that the total acid value is increased only by about 10 times of that before the test.

It is considered that this is because benzotriazole adsorbs on a surface of metal (copper, iron, aluminum) charged as catalyst to form a thin film so that polyol ester oil, HFO1234yf molecule and metal do not come into direct contact with each other, a facilitating effect of deterioration, oxidation and decomposition of polyol ester oil and HFO1234yf caused by metal catalyst dissolved in oil is suppressed, the phenyl-alpha-naphthylamine which is amine-based antioxidant captures the active linkage transmitting agent (free radical and OH radical) and stops linkage reaction, oxidation deterioration is suppressed and a synergetic effect is exerted. It is considered that amine-based element is effective in a relatively high temperature range and this effect is also added.

In the case of the example 2 condition 2 which is the second embodiment, a proper amount of benzotriazole and a proper amount of 2,6-ditertiary-butyl-p-cresol (DBPC) are dispersed in polyol ester oil which is the refrigeration oil, the increase in the total acid value is remarkably suppressed, the increase of the total acid value is increased only by about 20 times of that before the test even when 500 hours are elapsed after the test.

It is considered that this is because benzotriazole adsorbs on a surface of metal (copper, iron, aluminum) charged as catalyst to form a thin film so that polyol ester oil, HFO1234yf molecule and metal do not come into direct contact with each other, a facilitating effect of deterioration, oxidation and decomposition of polyol ester oil and HFO1234yf caused by metal catalyst dissolved in oil is suppressed, the 2,6-ditertiary-butyl-p-cresol (DBPC)-alpha-naphthylamine which is phenol-based antioxidant captures the active linkage transmitting agent (free radical and OH radical) and stops linkage reaction, oxidation deterioration is suppressed and a synergetic effect is exerted.

In the case of the example 2 condition 3 which is the second embodiment, a proper amount of benzotriazole and a proper amount of diallyl dithiophosphoric acid zinc (ZnDTP) are dispersed in polyol ester oil which is the refrigeration oil, the increase in the total acid value is remarkably suppressed, the increase of the total acid value is increased only by about four times of that before the test even when 500 hours are elapsed after the test.

It is considered that this is because benzotriazole adsorbs on a surface of metal (copper, iron, aluminum) charged as catalyst to form a thin film so that polyol ester oil, HFO1234yf molecule and metal do not come into direct contact with each other, a facilitating effect of deterioration, oxidation and decomposition of polyol ester oil and HFO1234yf caused by metal catalyst dissolved in oil is suppressed, diallyl dithiophosphoric acid zinc (ZnDTP) which is sulfur, phosphorus-based antioxidant decomposes hyperoxide produced during oxidation deterioration reaction and changes the hydroperoxide to a stable compound, the linkage starting reaction is suppressed and a synergetic effect is exerted.

From the above result, in any of the example 2 conditions 1 to 3, it is considered that production of free radical and OH radical which are fundamental factor for increasing the total acid value could be suppressed in a composite manner.

Next, the refrigerant and refrigeration oil which were the combinations of the example 2 conditions 1 to 3 and air and moisture were charged into the container 101 of the refrigeration cycle 120, three refrigeration cycle devices were set, and operation was carried out for 1000 hours under an overload condition.

As a result of measurement of the total acid value of the refrigeration oil after the test, it was confirmed that the increase in the total acid value is remarkably smaller than that of the conventional HFC-based refrigerant. According to this, even if air and moisture are slightly mixed into the refrigeration cycle, speed of deterioration and oxidation of the refrigeration oil and refrigerant can be made slow. Even if HFO1234yf is used as a refrigerant, it is possible to use polyol ester oil corresponding to the conventional HFC refrigerant by adding benzotriazole and amine-based, phenol-based, or sulfur, phosphorus-based antioxidant.

It is considered that this is because benzotriazole dispersed in refrigeration oil adsorbs on the various metal members constituting the refrigeration cycle device which is considered to function as catalyst, especially on a sliding portion in the compressor 120 which is prone to be activated by friction, a thin film is formed so that the refrigeration oil, the refrigerant molecule and the metal portion do not come into contact with each other, it reacts with friction powder in the refrigeration oil and dissolved metal, it becomes inert metal compound, and the catalyst function is remarkably suppressed, and if phenyl-alpha-naphthylamine and 2,6-ditertiary-butyl-p-cresol (DBPC) are further added, each of these elements captures the active linkage transmitting agent (OH radical) and stops linkage reaction, oxidation deterioration is suppressed, diallyl dithiophosphoric acid zinc (ZnDTP) decomposes hydroperoxide produced during oxidation deterioration reaction and changes the hydroperoxide to a stable compound, the linkage starting reaction is suppressed and a synergetic effect is exerted.

From the above result, the refrigerant and the refrigeration oil are sealed, as the refrigerant, hydrofluoroolefin having double bond of carbon, the base component composed of hydrofluoroolefin or a mixture of hydrofluorocarbon having no double bond is included in composition, benzotriazole and phenyl-alpha-naphthylamine which is amine-based antioxidant are included in the refrigeration oil, a thin adsorption film is formed on a surface of a metal member constituting the rotary compressor especially on a surface of a sliding member, direct contact between the refrigerant oil molecule, a refrigerant composed of hydrofluoroolefin having double bond of carbon in a composition and a metal member is suppressed, it is allowed to react with wearing powder which floats in the refrigeration oil or dissolved metal to form inert metal compound to suppress the catalyst function, the active linkage transmitting agent (OH radical) is captured to stop linkage reaction, oxidation deterioration is suppressed, deterioration speed of refrigeration oil is lowered in a synergistic manner, and long term reliability of the compressor and the refrigeration cycle device using same can be secured.

Although phenyl-alpha-naphthylamine is used as the amine-based antioxidant in the embodiment, the same effect can be obtained even if dialkyl diphenyl amine is used.

Benzotriazole and 2,6-ditertiary-butyl-p-cresol (DBPC) which is phenol-based antioxidant are included in the refrigeration oil, a thin adsorption film is formed on a surface of a metal member constituting the rotary compressor especially on a surface of a sliding member, direct contact between the refrigerant oil molecule, a refrigerant composed of hydrofluoroolefin having double bond of carbon in a composition and a metal member is suppressed, it is allowed to react with wearing powder which floats in the refrigeration oil or dissolved metal to form inert metal compound to suppress the catalyst function, the active linkage transmitting agent (OH radical) is captured to stop linkage reaction, oxidation deterioration is suppressed, deterioration speed of refrigeration oil is lowered in a synergistic manner, and long term reliability of the compressor and the refrigeration cycle device using same can be secured.

Although 2,6-ditertiary-butyl-p-cresol (DBPC) is used as the phenyl-based antioxidant in the embodiment, the same effect can be obtained even if 3-arylbenzofuran-2-one (intramolecule cyclic ester of hydroxycarboxylic acid) is used.

Benzotriazole and diallyl dithiophosphoric acid zinc (ZnDTP) which is sulfur, phosphorus-based antioxidant are included in the refrigeration oil, a thin adsorption film is formed on a surface of a metal member constituting the rotary compressor especially on a surface of a sliding member, direct contact between the refrigerant oil molecule, a refrigerant composed of hydrofluoroolefin having double bond of carbon in a composition and a metal member is suppressed, it is allowed to react with wearing powder which floats in the refrigeration oil or dissolved metal to form inert metal compound to suppress the catalyst function, hydroperoxide produced during oxidation deterioration reaction is decomposed and it is changed to a stable compound, the linkage starting reaction is suppressed, deterioration speed of refrigeration oil is lowered in a synergistic manner, and long term reliability of the compressor and the refrigeration cycle device using same can be secured.

Although diallyl dithiophosphoric acid zinc (ZnDTP) is used as the sulfur, phosphorus-based antioxidant in the embodiment, the same effect can be obtained even if dibenzyl disulfide, dicetyl sulfide, or dialkyl dithiophosphoric acid zinc is used.

INDUSTRIAL APPLICABILITY

As described above, the compressor of the present invention uses hydrofluoroolefin having double bond between carbons is used as a base component, and reliability of the compressor can be secured even if a refrigerant in which hydrofluorocarbon having no double bond is mixed is used. Therefore, the invention can also be applied to usage of a compressor for a water heater, a compressor for a car air conditioner, a compressor for a refrigerator, and a compressor for a dehumidifier.

EXPLANATION OF SYMBOLS

101 container
102 motor 102a stator
102b rotor
103 refrigeration oil
104 shaft
104a eccentric portion
105 compressing mechanism
106 cylinder
107 main bearing
108 auxiliary bearing
109 piston
110 vane
110a tip end
110b back portion
111 vane spring
112 suction port
113 suction chamber
114 compression chamber
115 discharge notch
116 discharge pipe
120 compressor
121 condenser
122 expansion mechanism
123 evaporator

The invention claimed is:

1. A compressor in which a refrigerant and refrigeration oil are sealed, the refrigerant being a hydrofluoroolefin having double bond of carbon in its composition or a mixture of hydrofluoroolefin as a base component and hydrofluorocarbon having no double bond, wherein dialkyl selenium and optionally at least one of metal phenate, and organic nitrogen compound is included in the refrigeration oil,
wherein an antioxidant selected from the group consisting of an amine-based antioxidant, a phenol-based antioxidant and a sulfur, phosphorus-based antioxidant is present in the refrigeration oil.

2. The compressor according to claim 1, wherein the amine-based antioxidant is included in the refrigeration oil.

3. The compressor according to claim 2, wherein the amine-based antioxidant is at least one of phenyl-alpha-naphthylamine and dialkyl diphenyl amine.

4. The compressor according to claim 1, wherein the phenol-based antioxidant is included in the refrigeration oil.

5. The compressor according to claim 4, wherein the phenol-based antioxidant is at least one of 2,6-ditertiary-butyl-p-cresol (DBPC), 3-arylbenzofuran-2-one (intramolecule cyclic ester of hydroxycarboxylic acid).

6. The compressor according to claim 1, wherein the sulfur, phosphorus-based antioxidant is included in the refrigeration oil.

7. The compressor according to claim 6, wherein the sulfur, phosphorus-based antioxidant is at least one of dibenzyl disulfide, dicetyl sulfide, dialkyl dithiophosphoric acid zinc and diallyl dithiophosphoric acid zinc (ZnDTP).

8. The compressor according to claim 1, wherein the hydrofluoroolefin is tetrafluoropropene (HFO1234yf), the hydrofluorocarbon is one or both of difluoromethane (HFC32) and pentafluoroethane (HFC125), and the refrigeration oil is one of polyvinyl ether, polyol ester and polyalkylene glycol.

9. A refrigeration cycle device for forming a refrigeration cycle which compresses, condenses, expands and evaporates a refrigerant, wherein the compressor according to claim 1 is used.

10. The compressor according to claim 1, wherein the refrigeration oil is polyol ester.

11. The compressor according to claim 1, wherein
a stator of a motor is fixed to an upper portion in a sealed container,
a compressing mechanism including a shaft driven by a rotor of motor is fixed to a lower portion in the sealed container,
a piston is inserted into an eccentric portion of a shaft in the cylinder of the compressing mechanism,
a suction chamber and a compressing chamber are formed through partitioning by a vane between an inner surface of the cylinder and an outer surface of the piston, and
the compressing mechanism is formed of a metal material.

12. The compressor according to claim 11, wherein the metal material comprises at least one selected from the group consisting of iron, copper and aluminum.

* * * * *